(12) United States Patent
Provost et al.

(10) Patent No.: US 12,479,568 B2
(45) Date of Patent: Nov. 25, 2025

(54) CURVED STIFFENER FOR A TURBINE ENGINE NACELLE AND METHOD FOR PRODUCING SUCH A STIFFENER

(71) Applicant: SAFRAN NACELLES, Gonfreville-l'Orcher (FR)

(72) Inventors: Benjamin Provost, Moissy-Cramayel (FR); Julien Lorrillard, Moissy-Cramayel (FR); Bertrand Léon Marie Desjoyeaux, Moissy-Cramayel (FR); Pierre Parant, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 313 days.

(21) Appl. No.: 18/552,829

(22) PCT Filed: Apr. 8, 2022

(86) PCT No.: PCT/FR2022/050661
§ 371 (c)(1),
(2) Date: Sep. 27, 2023

(87) PCT Pub. No.: WO2022/219271
PCT Pub. Date: Oct. 20, 2022

(65) Prior Publication Data
US 2024/0166332 A1  May 23, 2024

(30) Foreign Application Priority Data

Apr. 12, 2021 (FR) ...................................... 2103734

(51) Int. Cl.
*B64C 7/02* (2006.01)
*B29C 70/24* (2006.01)
(Continued)

(52) U.S. Cl.
CPC ................ *B64C 7/02* (2013.01); *B29C 70/24* (2013.01); *B29C 70/30* (2013.01); *B64C 2001/0072* (2013.01)

(58) Field of Classification Search
CPC ... B64C 7/02; B64C 2001/0072; B29C 70/24; B29C 70/30; B29D 99/0007;
(Continued)

(56) References Cited

U.S. PATENT DOCUMENTS 6,632,502 B1   10/2003  Allen et al.
2012/0119412 A1*  5/2012  Havens .................. B29C 33/00
                                                    264/230
(Continued)

FOREIGN PATENT DOCUMENTS

EP      2774854 A1    9/2014
FR      3100158 A1    3/2021

OTHER PUBLICATIONS

Machine Translation of FR 3100158 A1. (Year: 2021).*
(Continued)

*Primary Examiner* — Brian Handville
(74) *Attorney, Agent, or Firm* — Bookoff McAndrews, PLLC (57) ABSTRACT

Curved stiffener for a turbomachine cowl composed of a resin-impregnated fibrous reinforcement, including a stack of a plurality of layers of fibers stacked along the thickness direction and extending on the entire width of the fibrous reinforcement, each layer of fibers having a plurality of fibers parallel to each other extending along a direction inclined relative to the length direction, the fibers of two consecutive layers of fibers along the thickness direction have directions inclined relative to each other, and the layers of fibers are sewn together by sewing threads extending along the length direction, the fibrous reinforcement
(Continued)

includes a layer of reinforcing fibers having a plurality of fibers parallel to each other extending along the length direction, the layer of reinforcing fibers extending at least on the central part, over a width smaller than the width of the fibrous reinforcement.

12 Claims, 4 Drawing Sheets

(51) Int. Cl.
*B29C 70/30* (2006.01)
*B64C 1/00* (2006.01)

(58) Field of Classification Search
CPC ......... B29D 99/0014; B32B 3/14; B32B 3/18; B32B 5/26; B32B 7/09; F01D 25/24; B64D 29/00
See application file for complete search history.

(56) References Cited

U.S. PATENT DOCUMENTS

| | | | | |
|---|---|---|---|---|
| 2012/0286457 | A1* | 11/2012 | Everhart | B29C 53/824 264/531 |
| 2013/0236686 | A1* | 9/2013 | Horibe | B32B 5/026 442/314 |
| 2013/0266765 | A1* | 10/2013 | Dolzinski | B29C 66/45 156/92 |
| 2014/0248143 | A1* | 9/2014 | Ortiz Del Cerro | F01D 9/02 415/208.1 |

OTHER PUBLICATIONS

Search Report and Written Opinion issued in International Application No. PCT/FR2022/050661, mailed on Sep. 23, 2022.
Search Report issued in French Application No. 21 03734, mailed on Feb. 28, 2022.

\* cited by examiner

CURVED STIFFENER FOR A TURBINE ENGINE NACELLE AND METHOD FOR PRODUCING SUCH A STIFFENER

CROSS-REFERENCE TO RELATED APPLICATIONS

This is a National Stage Application under 35 U.S.C. § 371 of International Application No. PCT/FR2022/050661, filed Apr. 8, 2022, now published as WO 2022/219271 A1, which claims priority to French Patent Application No. 2103734, filed on Apr. 12, 2021.

TECHNICAL FIELD

The present disclosure relates to a curved stiffener for a turbomachine nacelle, particularly a curved stiffener composed of a resin-impregnated fibrous reinforcement. The present disclosure also relates to the method for manufacturing such a stiffener.

PRIOR ART

The nacelles are generally provided to accommodate a bypass turbojet engine able to generate, on the one hand, a stream of hot gases (also called primary stream) coming from the gas generator of the turbojet engine and, on the other hand, a stream of cold air (called secondary stream) coming from the fan and circulating outside the turbojet engine, through an annular passage generally called secondary flowpath. The two streams are ejected from the turbojet engine through the back of the nacelle.

In order to maintain the structure of the nacelle, one or more generally circumferential curved stiffeners can be provided to strengthen its structure. Composite stiffeners comprising multi-oriented fibrous reinforcements, and composed of a certain number of layers of unidirectional fibers, assembled by a seam in the thickness, called NCF (Non-Crimp-Fabric) are known. This type of reinforcement comprises a plurality of layers of parallel fibers, and each layer of fibers has fibers oriented according to an orientation different from the orientations of the fibers of the layers of fibers which are immediately adjacent thereto. This type of stiffener is obtained by sewing flat the plurality of layers of fibers together, by draping this reinforcement over a stiffener mold, then by impregnating it with resin, then by cross-linking the resin impregnated in the fibers.

However, this type of stiffener cannot comprise a layer of fibers oriented along the direction of the length of the stiffener. Indeed, the curvature of the stiffener generates a different length between the head of the stiffener and its feet, but the fibers generally used in the manufacture of the composite stiffener do not have sufficient elongation capacity to absorb this difference. The presence of a layer of fibers along the length direction of the stiffener therefore generates defects during the draping of the fibrous reinforcement on the shaped stiffener mold, for example the appearance of creases in the layers of fibers.

As a result, the resistance of such stiffeners is lower. Indeed, the impact of the undulations on the structural strength of the stiffener is a particular point of interest.

There is therefore a real need for a textile reinforcement adapted to the mechanical strength requirements of the stiffener as well as to the forming methods, and capable of overcoming the aforementioned defects.

DISCLOSURE OF THE INVENTION

The present disclosure relates to a curved stiffener for a turbomachine cowl composed of a resin-impregnated fibrous reinforcement, the stiffener comprising a ring portion shaped head, two ring portion shaped feet concentric with the head and having a radius greater than a radius of the head, and two inclined portions, each connecting one of the feet to a lateral side of the head, the fibrous reinforcement extending along a length direction, a width direction and a thickness direction, the dimension of the fibrous reinforcement along the length direction being greater than the dimension of the fibrous reinforcement along the width direction, and the dimension of the fibrous reinforcement along the thickness direction being the smallest of the dimensions of the fibrous reinforcement, the fibrous reinforcement having a central portion configured to form the head, two end portions disposed on either side of the central portion and configured to form the feet, two connecting portions connecting the central portion to the end portions and configured to form the inclined portions, the fibrous reinforcement comprising a stack of a plurality of layers of fibers stacked along the thickness direction and extending on the entire width of the fibrous reinforcement, each layer of fibers having a plurality of fibers parallel to each other extending along a direction inclined relative to the length direction, the fibers of two consecutive layers of fibers along the thickness direction have directions inclined relative to each other, and the layers of fibers are sewn together by sewing threads extending along the length direction, and in which the fibrous reinforcement comprises a layer of reinforcing fibers sewn with the layers of fibers by the sewing threads having a plurality of fibers parallel to each other extending along the length direction, the layer of reinforcing fibers extending at least on the central part, over a width smaller than the width of the fibrous reinforcement.

In the present disclosure, it is understood that the dimension of the fibrous reinforcement along the thickness direction is very much lower than the dimension of the fibrous reinforcement along the length and width directions.

In some non-limiting examples, when the stiffener is placed in a turbomachine nacelle, the thickness direction corresponds to the radius direction, the length direction corresponds to the circumferential direction of the nacelle and the width direction corresponds to the axial direction of the nacelle. In these examples, it is understood that the ring portion shaped head is concentric with the two ring portion shaped feet, in a given plane perpendicular to the axial direction of the nacelle and passing through the stiffener, and the radius of the head is smaller than the radius of the feet. However, other configurations can be envisaged, in which the length direction would correspond for example to the axial direction or an intermediate direction between the axial direction and circumferential direction when the stiffener is placed in a nacelle. Furthermore, the stiffener of the present invention could be used in parts other than turbomachine nacelles.

The resistance and stiffness of such a stiffener including a layer of reinforcing fibers oriented in the length direction (in other words, in the 0 degree way relative to the length direction) increase. Indeed, the presence of reinforcing fibers makes it possible to better withstand the stresses that the stiffener could undergo, particularly when this layer is located at the level of the head of the stiffener. For example, such a stiffener makes the nacelle able to more easily take up compressive and tensile stresses along the radius direction.

Moreover, the configuration of this embodiment makes it possible to include a layer of reinforcing fibers lengthwise of the fibrous reinforcement, and therefore of the stiffener, without defects appearing during the draping. This appearance is guaranteed by the fact that the layer of reinforcing fibers extends on a width smaller than the width of the stiffener.

This solution makes it possible to obtain a stiffener with good performance and the fibrous reinforcement of such a stiffener can be entirely draped in a single draping step. Indeed, the layer of reinforcing fibers can be sewn with the other layers of fibers in a single sewing step. It therefore appears that no step of enhancing the fibrous reinforcement, which could be planned before or after the draping, is necessary to obtain a functional stiffener.

In some embodiments, the layer of reinforcing fibers extends on part of the connecting portions.

In this configuration, the fibers of the layer of reinforcing fibers protruding on the connecting portions will facilitate the centering of the fibrous reinforcement during the draping of the fibrous reinforcement on the stiffener mold. Indeed, once disposed on the mold, these fibers protruding on the connecting portions will present a slightly higher tension than the fibers disposed on the central portion. In this way, the fibrous reinforcement will be brought to be placed so as to evenly distribute the fibers protruding on the connecting portions on either side of the central portion. The fibrous reinforcement is therefore more easily centered on the stiffener mold.

In some embodiments, the layer of reinforcing fibers is disposed on the plurality of layers of fibers at one end of the fibrous reinforcement along the thickness direction.

In this configuration, the manufacture of the fibrous reinforcement is facilitated.

In some embodiments, the stiffener comprises at least one additional layer of reinforcing fibers disposed in the stack of the layers of fibers.

In this configuration, the stiffness of the stiffener is increased. It is then possible to control the stiffness of the stiffener according to the number of additional layers of reinforcing fibers included in the stack of the layers of fibers.

In some embodiments, the stiffener comprises chain stitch seams disposed at the ends of the fibrous reinforcement along the width direction.

In this configuration, the cutting of the fibrous reinforcement disposed on the stiffener mold is facilitated.

In some embodiments, the layers of fibers and the layers of reinforcing fibers are sewn together by knit-type stitches.

The use of knit stitches promotes the deformability of the fibrous reinforcement.

In some embodiments, the tension of the sewing threads is lower in the connecting portions than the tension of the sewing threads in the central portion.

In this configuration, the connecting portions of the fibrous reinforcement are able to undergo greater deformations than the central part of the fibrous reinforcement. Particularly, this configuration facilitates the draping of the fibrous reinforcement while limiting the defects that could appear during the draping.

In some embodiments, the distribution of the sewing stitches in the central portion is denser than the distribution of the sewing stitches in the connecting portions.

In this configuration, the layer of reinforcing fibers is sewn with other layers of fibers in a more robust manner, which helps the stability of the fibrous reinforcement.

In some embodiments, the sewing threads sewn on the end portions and the connecting portions have an excess length.

In this configuration, the excess length of the sewing threads allows easier deformation of the end portions and of the connecting portions. The draping of the fibrous reinforcement on the stiffener mold is therefore facilitated.

The present disclosure also relates to a nacelle comprising a stiffener as defined above.

The present disclosure also relates to an aircraft engine comprising the nacelle as defined above.

The nacelle and the aircraft engine have the advantages disclosed above.

The present disclosure also relates to a method for manufacturing a curved stiffener as defined above comprising:
a sewing step in which the fibrous reinforcement is formed by sewing together the plurality of layers of fibers and the layer(s) of reinforcing fibers, a draping step in which the fibrous reinforcement is disposed on a stiffener mold, an impregnation step in which the fibrous reinforcement disposed on the stiffener mold is impregnated with resin and a polymerization step in which the resin impregnated in the fibrous reinforcement is solidified.

Such a method makes it possible to obtain a stiffener with the advantages mentioned above.

The aforementioned characteristics and advantages, as well as others, will appear upon reading the following detailed description, of exemplary embodiments of the device and of the method proposed. This detailed description refers to the appended drawings.

BRIEF DESCRIPTION OF THE DRAWINGS

The appended drawings are schematic and are intended primarily to illustrate the principles of the present disclosure.

DESCRIPTION OF THE EMBODIMENTS

In order to make the disclosure more concrete, an example of a device is described in detail below, with reference to the appended drawings. It is recalled that the invention is not limited to this example.

Figure 7:
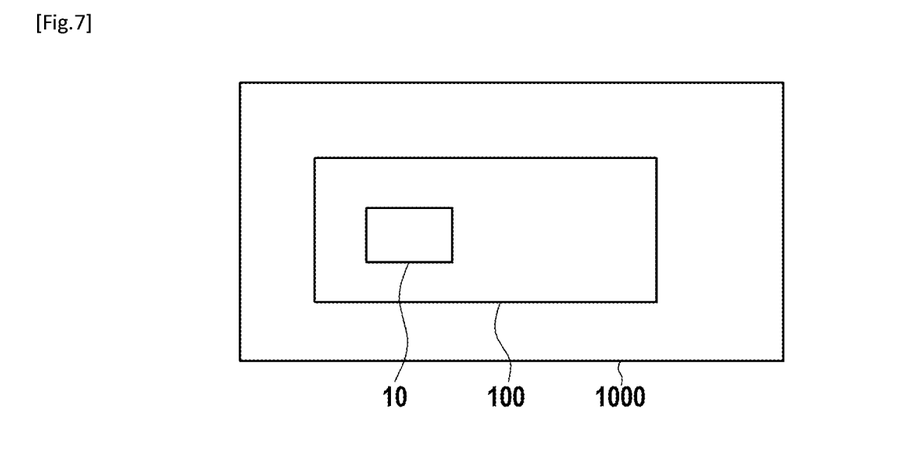
FIG. 7 schematically represents an aircraft engine comprising a nacelle including a stiffener according to the embodiment.

FIG. 7 schematically represents an aircraft engine 1000 comprising a nacelle 100. The nacelle 100 comprises a cowl including a curved stiffener 10 according to a first embodiment of the invention.

Figure 1A:
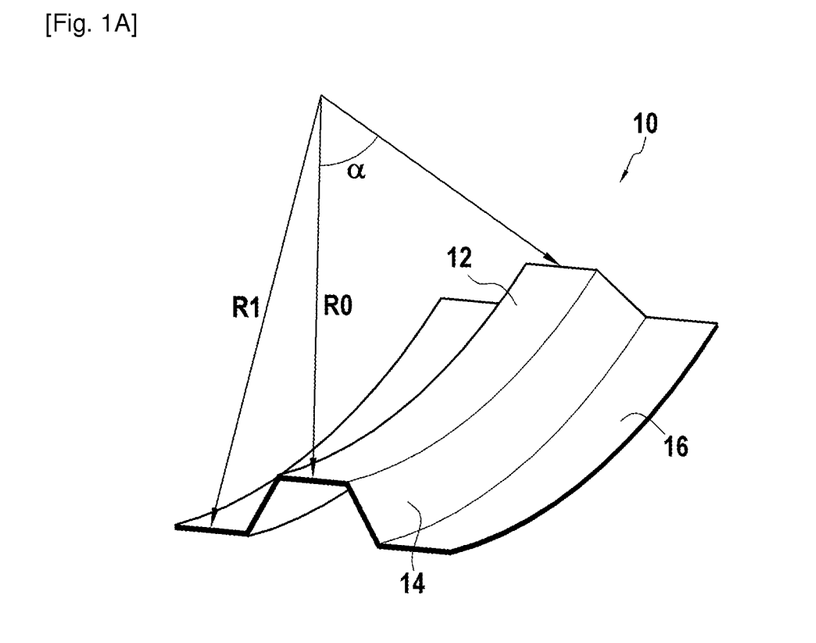
FIG. 1A represents a curved stiffener according to a first embodiment of the curved stiffener.

FIG. 1A represents the curved stiffener 10 according to a first embodiment of the invention. The stiffener 10 is composed of a resin-impregnated fibrous reinforcement 20 and comprises a ring portion shaped head 12 of radius R0, two ring portion shaped feet 16 concentric with the head 12 of radius R1, and two inclined portions 14, each connecting one of the feet 16 to a lateral side of the head 12. Moreover, the radius R1 of the two feet 16 is greater than the radius R0 of the head 12 when the nacelle 100 has a circular section. Thus, the stiffener 10 extends on an angle α (alpha) measuring arc of a circle. This shape of the stiffener 10 is called omega shape. Particularly, it is observed that the head 12 and the inclined portions 14 taken independently have a trapezoidal shape. In some examples, the angle α can extend up to 360 degrees.

Figure 2:
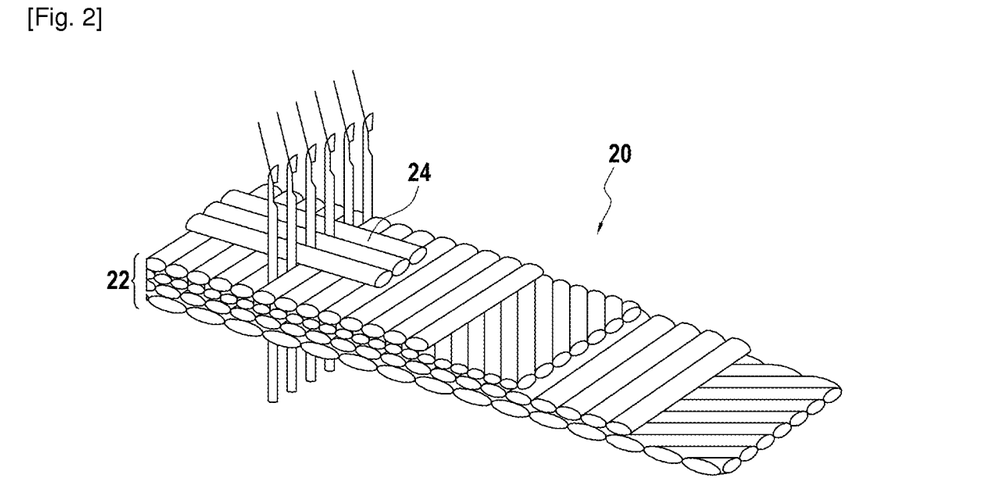
FIG. 2 represents a partial view of a fibrous reinforcement according to a first embodiment, during a sewing step.

FIG. 2 represents a partial view of the fibrous reinforcement 20 according to a first embodiment. The fibrous reinforcement 20 extends along a length direction, a width direction and a thickness direction. These three directions define an orthogonal reference frame when the fibrous reinforcement 20 is disposed on a planar surface.

The dimension of the fibrous reinforcement 20 along the length direction is greater than the dimension of the fibrous reinforcement 20 along the width direction, and the dimension of the fibrous reinforcement 20 along the thickness direction is the smallest of the dimensions of the fibrous reinforcement 20. It is understood that the dimension of the fibrous reinforcement 20 along the thickness direction is negligible compared to the two other dimensions of the fibrous reinforcement 20. In other words, the fibrous reinforcement 20 mainly extends on two dimensions.

Moreover, once the stiffener is disposed in a turbomachine nacelle, the thickness direction corresponds to the direction of the radius of the turbomachine, the length direction corresponds to the circumferential direction of the nacelle and the width direction corresponds to the axial direction of the nacelle.

On the fibrous reinforcement 20, a central portion configured to form the head 12 of the manufactured stiffener is defined. Two end portions disposed on either side of the central portion configured to form the feet 16, and two connecting portions connecting the central portion to the end portions and configured to form the inclined portions 14, are also defined.

As represented in FIG. 2, the fibrous reinforcement 20 comprises a stack of a plurality of layers of fibers 22 stacked along the thickness direction. Each layer of fibers 22 extends on the entire width of the fibrous reinforcement 20. Moreover, each layer of fibers 22 is composed of a plurality of fibers parallel to each other. The fibers of the layers of fibers 22 extending along a direction inclined relative to the length direction and the fibers of two consecutive layers of fibers 22 along the thickness direction have directions inclined relative to each other.

In the example of this embodiment and in a non-limiting manner, the fibers of the successive layers of fibers 22 along the thickness direction have angles of −45° (or 135°), 90°, 45°90°, 45°, 270° and 225° respectively with the length direction.

The fibrous reinforcement 20 further comprises a layer of reinforcing fibers 24. The layer of reinforcing fibers 24 is disposed on the plurality of layers of fibers 22, at one end of the fibrous reinforcement 20 along the thickness direction. In other words, the layer of reinforcing fibers 24 is disposed above the layers of fibers 22 in the way of the thickness direction.

The layer of reinforcing fibers 24 has a plurality of fibers parallel to each other extending along the length direction, that is to say have an angle of 0° with the length direction, the layer of reinforcing fibers 24 extending at least on the central part, over a width smaller than the width of the fibrous reinforcement 20.

In this example and in a non-limiting manner, the fibrous reinforcement is composed of NCF (Non-Crimp-Fabric) carbon fibers. It is then understood that the fibers of the layers of fibers 22 and the fibers of the layer of reinforcing fibers 24 are carbon fibers. However, glass fibers or hybrid fibers could also be used.

As shown in FIG. 2, all of the layers of fibers 22 and the layer of reinforcing fibers 24 are sewn together by sewing threads extending along the length direction. For example, these seams are knit-type stitches.

Moreover, in the embodiment of FIG. 2, by way of non-limiting example, a chain stitch-type seam is provided at the ends of the fibrous reinforcement 20 along the width direction. The chain stitch seams also extend along the length direction and delimit the width of the fibrous reinforcement 20.

Figure 3:
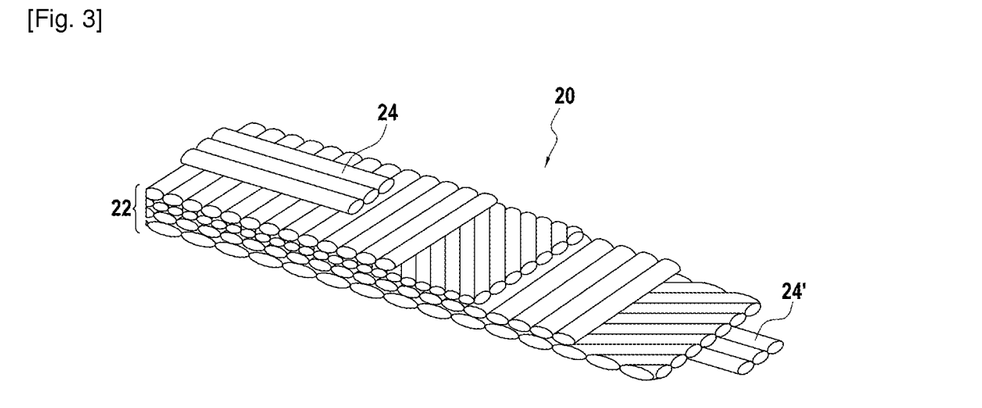
FIG. 3 represents a partial view of a fibrous reinforcement according to a second embodiment.

FIG. 3 represents a partial view of a fibrous reinforcement according to a second embodiment. In this embodiment, the fibrous reinforcement 20 comprises at least one additional layer of reinforcing fibers 24' disposed in the stack of the layers of fibers 22. In the embodiment of FIG. 3, the additional layer of reinforcing fibers 24' is identical to the layer of reinforcing fibers 24. It therefore comprises a plurality of fibers oriented along the direction of the length and extends on the central portion of the fibrous reinforcement 20. Moreover, in some embodiments, the reinforcement layer 24 can be provided above, below or inside the stack of the layers of fibers 22. Similarly, the additional layer of reinforcing fibers 24' can be provided above, below or inside the stack of the layers of fibers 22.

In some other examples, the additional layer of reinforcing fibers 24' is of a different nature from the layer of reinforcing fibers 24. For example, the additional layer of reinforcing fibers 24' can be composed of fiberglass.

It is understood that in this embodiment, the fibrous reinforcement 20 can comprise a plurality of additional layers of reinforcing fibers 24' in order to adjust the stiffness of the stiffener to the needs of the user. Moreover, in the same purpose, the thicknesses of the additional layers of reinforcing fibers(s) 24' may be different from each other and/or different from the thickness of the layer of reinforcing fibers 24. Similarly, the nature of the fibers of the additional layers of reinforcing fibers 24' may be of natures different from each other and/or different from the nature of the layer of reinforcing fibers 24.

Figures 4A, 4B:
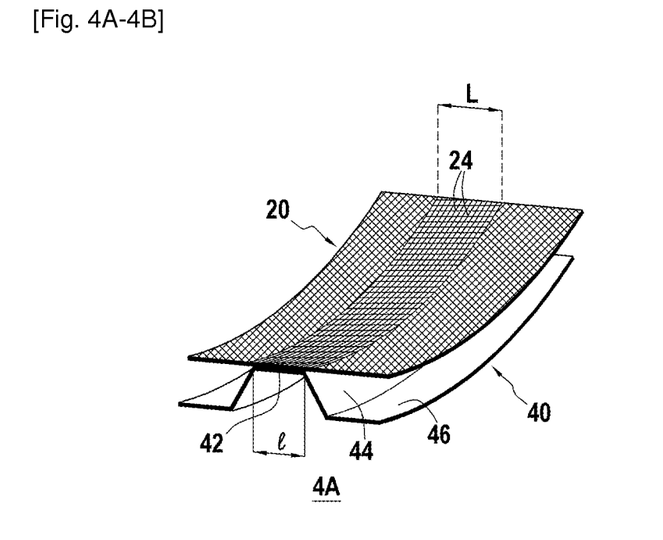
FIGS. 4A and 4B represent the fibrous reinforcement and the stiffener mold at different draping instants.

FIGS. 4A and 4B represent the fibrous reinforcement 20 which is disposed on a stiffener mold 40 at different times of the draping. FIG. 4A represents the fibrous reinforcement 20 positioned to be draped over the stiffener mold 40. FIG. 4B represents the fibrous reinforcement 20 draped over the stiffener mold 40.

The stiffener mold 40 has a shape similar to the shape of the stiffener and comprises a head part 42, foot parts 46 and connecting parts 44 connecting the foot parts 46 to the head part 42.

The fibrous reinforcement 20 is configured to cooperate with the mold 40, that is to say to match the shape of the mold 40. More particularly, the central part, the connecting parts and the end parts of the reinforcement fibrous 20 are configured to cooperate respectively with the head part 42, the connecting parts 44 and the foot parts 46.

The head part 42 extends on a width I along the width direction while the layers of reinforcing fibers 24 of the fibrous reinforcement 20 extend on a width L along the width direction, the width I of the head part 42 being smaller than or equal to the width L of the layer of reinforcing fibers 24. Thus, the layers of reinforcing fibers 24 extend on the head part 42 and, in the present non-limiting example, partially extend on the connecting parts 44.

Moreover, in order to facilitate the draping illustrated in FIGS. 4A and 4B, the tension of the sewing threads is lower in the connecting portions than the tension of the sewing threads in the central portion. Also, the distribution of the sewing stitches in the central portion is denser than the distribution of the sewing stitches in the connecting portions.

In other words, the fibrous reinforcement 20 is more easily deformable and more flexible at the level of the connecting portions and of the end portions than at the level of the central portion.

Figure 5:
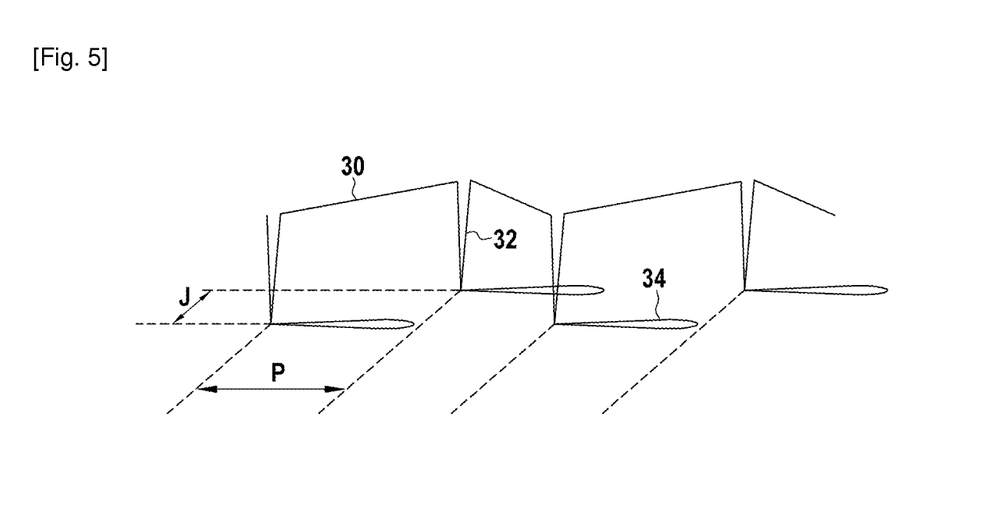
FIG. 5 schematically represents a sewing thread of the fibrous reinforcement.

To this end, FIG. 5 schematically represents a sewing thread 30 of the fibrous reinforcement 20. The sewing thread 30 extends along the direction of the length. The sewing stitches having two through parts 32, back-and-forth, and a sewing loop 34 are regularly provided. The sewing stitches are spaced apart by one pitch P lengthwise and by one gauge J widthwise.

The total thread length used for a sewing stitch, comprising the length of the through parts 32 and the length of the sewing loop 34, is variable depending on the tension desired to be applied at the level of the sewing stitch. Particularly, this length may have an excess length compared to the thread length of a conventional sewing stitch. This excess length is calculated using the following formula.

[Math. 1]

$$\frac{2P.R1}{R0} + \sqrt{\left(\frac{P.R1}{R0}\right)^2 + J^2} - 2P - \sqrt{P^2 + J^2} \quad (1)$$

Figure 1B:
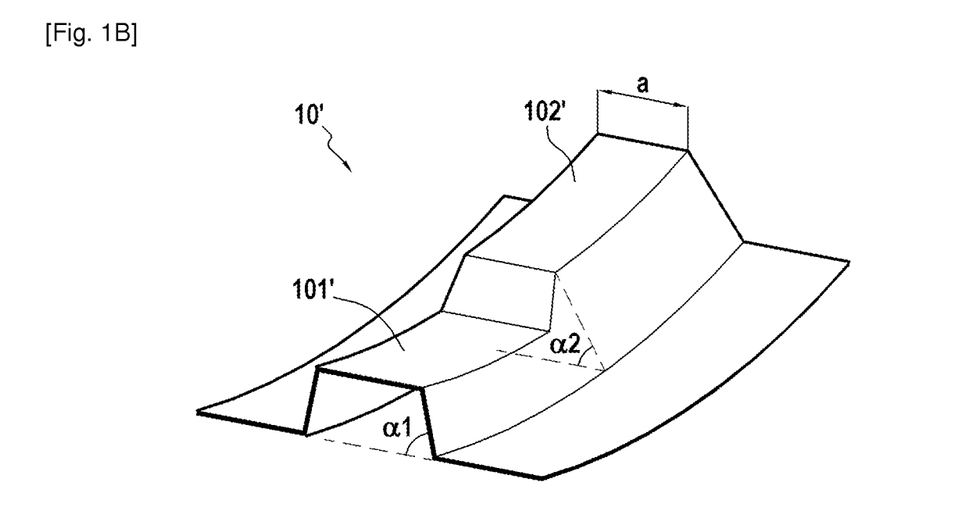
FIG. 1B represents a curved stiffener according to a second embodiment of the curved stiffener.

FIG. 1B represents a stiffener 10' according to a second embodiment of the invention. The characteristics identical to the first embodiment are omitted.

In this embodiment, the stiffener 10' comprises two portions 101' and 102' in the shape of a trapezoid as previously described for the stiffener 10 in FIG. 1A, according to the first embodiment. Particularly, the trapezoidal shape comprises a small base corresponding to the head, a large base and sides corresponding to the inclined portions.

The trapezoidal shape of the portion 101' has an angle α1 between its large base and its sides while the trapezoidal shape of the portion 102' presents an angle α2 between its large base and its sides. Moreover, the width a of the head of the stiffener 10' of the second embodiment is retained over its whole length.

The configuration of FIG. 1B makes it possible to adapt the shape of the stiffener 10' according to structural and dimensional constraints that may be imposed by the nacelle 100.

Figure 1C:
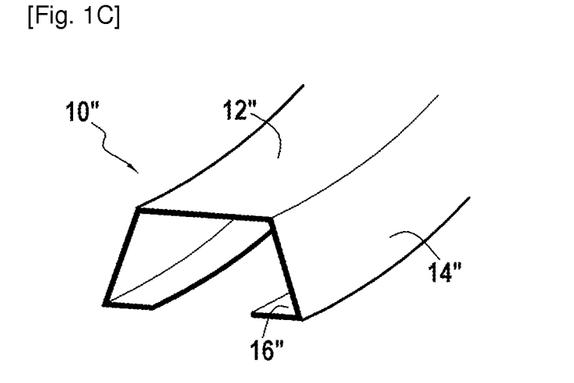
FIG. 1C represents a curved stiffener according to a third embodiment of the curved stiffener.

FIG. 1C represents a stiffener 10" according to a third embodiment. The characteristics identical to the first embodiment are omitted.

In the third embodiment, the stiffener 10" comprises a head 12", connecting parts 14" and feet 16". In this embodiment, the feet 16" extend inwardly of the stiffener 10" along the width direction. In other words, the feet 16" extend below the head 12" in the way of the thickness direction.

Figure 6:
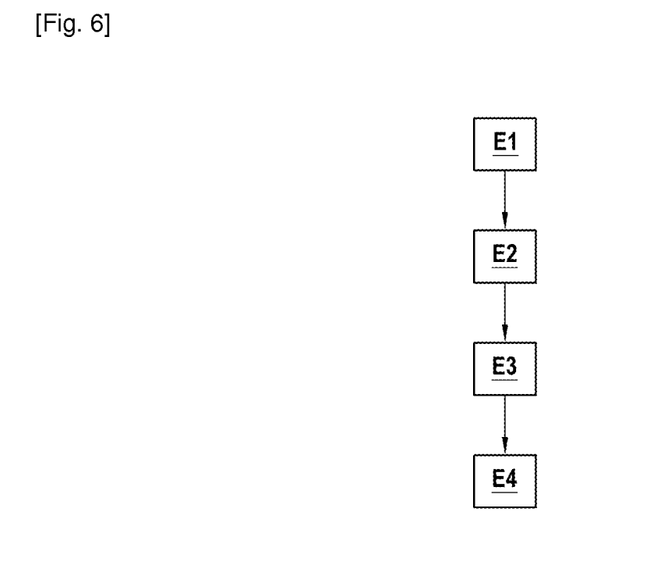
FIG. 6 schematically represents the steps of the method for forming the stiffener of FIG. 2.

FIG. 6 schematically represents the steps of the method for forming the stiffener according to the first embodiment. This method also applies to the second and third embodiments. The method for manufacturing the stiffener successively comprises a sewing step E1, a draping step E2, an impregnation step E3 and a polymerization step E4.

In the sewing step E1, the layers of fibers 22 and the layers of reinforcing fibers 24 are sewn together to form the fibrous reinforcement 20. As explained above, the stitches are of the knit type. Moreover, during this operation, the chain stitch-type seams are sewn at the ends along the direction of the width of the formed fibrous reinforcement 20.

In the draping step E2, the fibrous reinforcement 20 is draped over the stiffener mold 40 so that the fibrous reinforcement 20 takes the form of a curved stiffener. The mold 40 can be of the male type as illustrated in FIG. 4A, or of the female type. A female-type stiffener mold 40 corresponds to a mold whose shape is complementary to the shape of a male stiffener mold 40. The male-type stiffener mold 40 is generally convex in shape while the female-type stiffener mold is generally concave in shape.

In the second and third embodiments, appropriate molds are used during the draping step E2.

In the impregnation step E3, the fibrous reinforcement 20 disposed on the mold 40 is impregnated with resin. This impregnation can be performed by resin infusion in an under-pressurized environment (pressure less than 1 bar), using a rigid mold and a flexible membrane or by Resin Transfer Molding (also called RTM) in an over-pressurized environment (pressure more than 1 bar), using two rigid molds. In this example, the resin is of low viscosity.

In the polymerization step E4, the fibrous reinforcement 20 disposed in the mold 40 and impregnated with resin is polymerized in an oven. In this non-limiting example, the fibrous reinforcement is maintained at 120° C. for 5 hours.

Finally, a stiffener 10 is obtained once it has been demolded from the stiffener mold 40.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Consequently, the description and the drawings should be considered in an illustrative rather than restrictive sense.

It is also obvious that all the characteristics described with reference to a method can be transposed, alone or in combination, to a device, and conversely, all the characteristics described with reference to a device can be transposed, alone or in combination, to a method.

The invention claimed is:

1. A curved stiffener for a turbomachine cowl composed of a resin-impregnated fibrous reinforcement,
    the stiffener comprising a ring portion shaped head, two ring portion shaped feet concentric with the head and having a radius greater than a radius of the head, and two inclined portions, each connecting one of the feet to a lateral side of the head,
    the fibrous reinforcement extending along a length direction, a width direction and a thickness direction,
    the dimension of the fibrous reinforcement along the length direction being greater than the dimension of the fibrous reinforcement along the width direction, and the dimension of the fibrous reinforcement along the thickness direction being the smallest of the dimensions of the fibrous reinforcement,
    the fibrous reinforcement having a central portion configured to form the head,
    two end portions disposed on either side of the central portion and configured to form the feet, two connecting portions connecting the central portion to the end portions and configured to form the inclined portions, the fibrous reinforcement comprising a stack of a plurality of layers of fibers stacked along the thickness direction and extending on the entire width of the fibrous reinforcement, each layer of fibers having a plurality of fibers parallel to each other extending along a direction inclined relative to the length direction, the fibers of two consecutive layers of fibers along the thickness direction have directions inclined relative to each other, and the layers of fibers are sewn together by sewing threads extending along the length direction, wherein the fibrous reinforcement comprises a layer of reinforcing fibers sewn with the layers of fibers by the sewing threads having a plurality of fibers parallel to each other extending along the length direction, the layer of reinforcing fibers extending at least on the central part, over a width smaller than the width of the fibrous reinforcement.

2. The stiffener according to claim 1 wherein the layer of reinforcing fibers extends on part of the connecting portions.

3. The stiffener according to claim 1, wherein the layer of reinforcing fibers is disposed on the plurality of layers of fibers at one end of the fibrous reinforcement along the thickness direction.

4. The stiffener according to claim 1, comprising at least one additional layer of reinforcing fibers disposed in the stack of the layers of fibers.

5. The stiffener according to claim 1, comprising chain stitch seams disposed at the ends of the fibrous reinforcement along the width direction.

6. The stiffener according to claim 1, wherein the layers of fibers and the layers of reinforcing fibers are sewn together by knit-type stitches.

7. The stiffener according to claim 1, wherein the tension of the sewing threads is lower in the connecting portions than the tension of the sewing threads in the central portion.

8. The stiffener according to claim 1, wherein a distribution of sewing stitches in the central portion is denser than a distribution of sewing stitches in the connecting portions.

9. The stiffener according to claim 1, wherein the sewing threads sewn on the end portions and the connecting portions have an excess length.

10. A nacelle comprising a stiffener according to claim 1.

11. An aircraft engine comprising a nacelle according to claim 10.

12. A method for manufacturing a curved stiffener according to claim 1 comprising:

a sewing step in which the fibrous reinforcement is formed by sewing together the plurality of layers of fibers and the layer(s) of reinforcing fibers, a draping step in which the fibrous reinforcement is disposed on a stiffener mold, an impregnation step in which the fibrous reinforcement disposed on the stiffener mold is impregnated with resin, a polymerization step in which the resin impregnated in the fibrous reinforcement is solidified.

* * * * *